United States Patent
Shivaraju et al.

(10) Patent No.: US 11,456,503 B2
(45) Date of Patent: Sep. 27, 2022

(54) METHOD AND APPARATUS FOR STREAMLINED BATTERY SWAPPING

(71) Applicant: ZEBRA TECHNOLOGIES CORPORATION, Lincolnshire, IL (US)

(72) Inventors: Raghavendra Shivaraju, Holtsville, NY (US); Bijosh Thykkoottathil, Holtsville, NY (US); Michael Robustelli, Smithtown, NY (US); Marek Trusinski, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 74 days.

(21) Appl. No.: 16/776,242

(22) Filed: Jan. 29, 2020

(65) Prior Publication Data

US 2021/0234140 A1    Jul. 29, 2021

(51) Int. Cl.
*H01M 50/20* (2021.01)
*H01M 10/42* (2006.01)

(52) U.S. Cl.
CPC ......... *H01M 50/20* (2021.01); *H01M 10/425* (2013.01)

(58) Field of Classification Search
CPC ............... H01M 50/20; H01M 10/425; H04W 52/0296; H04W 52/0261; G06F 1/30
USPC ........................................................ 320/113
See application file for complete search history.

(56) References Cited

U.S. PATENT DOCUMENTS

| | | | |
|---|---|---|---|
| 5,423,045 A * | 6/1995 | Kannan ..................... | G06F 1/30 365/229 |
| 9,203,252 B2 * | 12/2015 | Robison ................. | G08B 21/18 |
| 9,301,256 B2 * | 3/2016 | Mohan .............. | H04W 52/0229 |
| 9,352,905 B2 * | 5/2016 | Fly ......................... | G06F 1/3212 |
| 9,761,066 B2 * | 9/2017 | Chen ..................... | G01R 31/343 |
| 10,090,498 B2 * | 10/2018 | Olsson ................ | H01M 10/623 |
| 2009/0098914 A1 * | 4/2009 | Martin-Cocher ......................... | H04W 52/0264 455/572 |
| 2018/0035383 A1 | 2/2018 | Cavallaro et al. | |
| 2018/0035384 A1 | 2/2018 | Kim et al. | |
| 2018/0082570 A1 | 3/2018 | Maeshwari et al. | |
| 2021/0234140 A1 * | 7/2021 | Shivaraju .............. | H01M 50/20 |

OTHER PUBLICATIONS

IEEE Std 1625 TM, IEEE Standard for Rechargeable Batteries for Multi-Cell Mobile Computing Devices,Oct. 20, 2006, IEEE; pp. 28 (Year: 2006).*
International Search Report and Written Opinion for International Application No. PCT/US2021/015831 dated Apr. 14, 2021.

* cited by examiner

*Primary Examiner* — M Baye Diao (57) ABSTRACT

A mobile computing device includes: a battery compartment configured to removably secure a first battery pack; an output device; and a processor configured to: detect a second battery pack in proximity to the mobile computing device; responsive to detecting the second battery pack, place the mobile computing device in a low-power operational mode; control the output device to generate a battery swap readiness notification; and responsive to securing of the second battery pack in the battery compartment in place of the first battery pack, return the mobile computing device to a full-power operational mode.

19 Claims, 7 Drawing Sheets

METHOD AND APPARATUS FOR STREAMLINED BATTERY SWAPPING

BACKGROUND

Mobile devices can be equipped with removable battery packs. When available battery capacity is low or exhausted during use, the current battery pack can be removed and replaced with another. However, swapping battery packs may require time-consuming interruption in regular device operations.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Mobile computing devices with removable, rechargeable battery packs can be deployed in a wide variety of environments, including warehouse facilities (e.g. for use in transport and logistics activities), medical facilities, manufacturing facilities and the like. Such devices may be operated continuously for extended periods of time, during which the battery pack may become depleted and require replacement.

Some devices enable "hot swapping" of battery packs, in which the operator may simply remove the current battery pack and insert a new battery pack, without taking any other actions to prepare the device for the swap. Hardware enabling hot swap functionality (e.g. auxiliary rechargeable batteries, supercapacitors and the like) can be costly to implement, however.

Other devices mitigate the cost of implementing hot swap functionality by implementing "warm swap" functionality, in which the device is placed into a low-power state before the battery packs are swapped. While some hardware cost and complexity can be avoided in this manner, warm swapping may necessitate additional interactions between the operator and the device, e.g. to launch a settings application and instruct the device to enter the low-power mode for battery swapping. Such interactions may be time-consuming, extending the period of time the regular operations of the device are interrupted.

Examples disclosed herein are directed to a mobile computing device, comprising: a battery compartment configured to removably secure a first battery pack; an output device; and a processor configured to: detect a second battery pack in proximity to the mobile computing device; responsive to detecting the second battery pack, place the mobile computing device in a low-power operational mode; control the output device to generate a battery swap readiness notification; and responsive to securing of the second battery pack in the battery compartment in place of the first battery pack, return the mobile computing device to a full-power operational mode.

Additional examples disclosed herein are directed to a method comprising: detecting a second battery pack in proximity to a mobile computing device having a battery compartment configured to removably secure a first battery pack; responsive to detecting the second battery pack, placing the mobile computing device in a low-power operational mode; controlling an output of the mobile computing device to generate a battery swap readiness notification; and responsive to securing of the second battery pack in the battery compartment in place of the first battery pack, returning the mobile computing device to a full-power operational mode.

Further examples disclosed herein are directed to a mobile computing device, comprising: a battery compartment configured to removably secure a first battery pack; an output device; and a processor configured to: detect a second battery pack in proximity to the mobile computing device; receive a charge state indicator from the second battery pack; determine whether the charge state indicator exceeds a threshold; when the charge state indicator does not exceed the threshold, control the output device to generate a warning notification.

Still further examples disclosed herein are directed to a method, comprising: detecting a second battery pack in proximity to a mobile computing device having a battery compartment configured to removably secure a first battery pack; receiving a charge state indicator from the second battery pack; determining whether the charge state indicator exceeds a threshold; when the charge state indicator does not exceed the threshold, controlling an output device of the mobile computing device to generate a warning notification.

Figure 1:
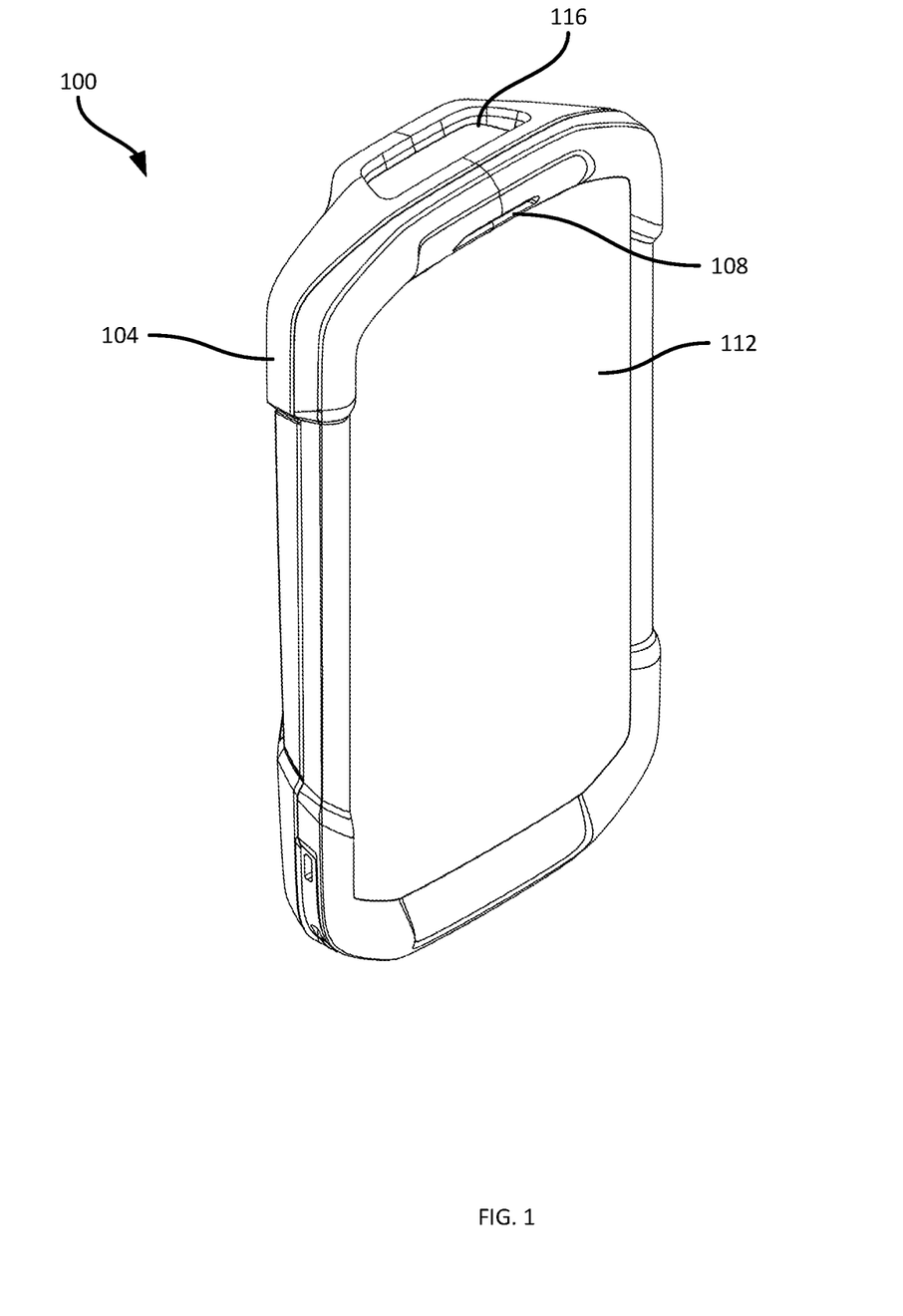
FIG. 1 is an front isometric view of a mobile computing device.

FIG. 1 depicts an example mobile computing device 100 (also referred to herein as the mobile device 100 or simply the device 100). The device 100 is implemented as a handheld computer in the illustration of FIG. 1. In other examples, the device 100 can be implemented in any of a variety of other form factors, including laptop computers, tablet computers, smartphones, and the like.

The device 100 includes a housing 104 supporting various other components of the device, including at least one output device and at least one input device. In the present example, the output devices include a speaker 108 and a display 112. The display 112 can implement both an output device and an input device in the form of a touch screen. Other examples of input devices include a barcode scanner 116. Various other examples of output devices are also contemplated, such as indicator lights (e.g. light-emitting diodes (LEDs) supported by the housing 104. Various other examples of input devices are also contemplated, such as buttons or switches disposed on the housing 104, a microphone, and the like.

Figure 2:
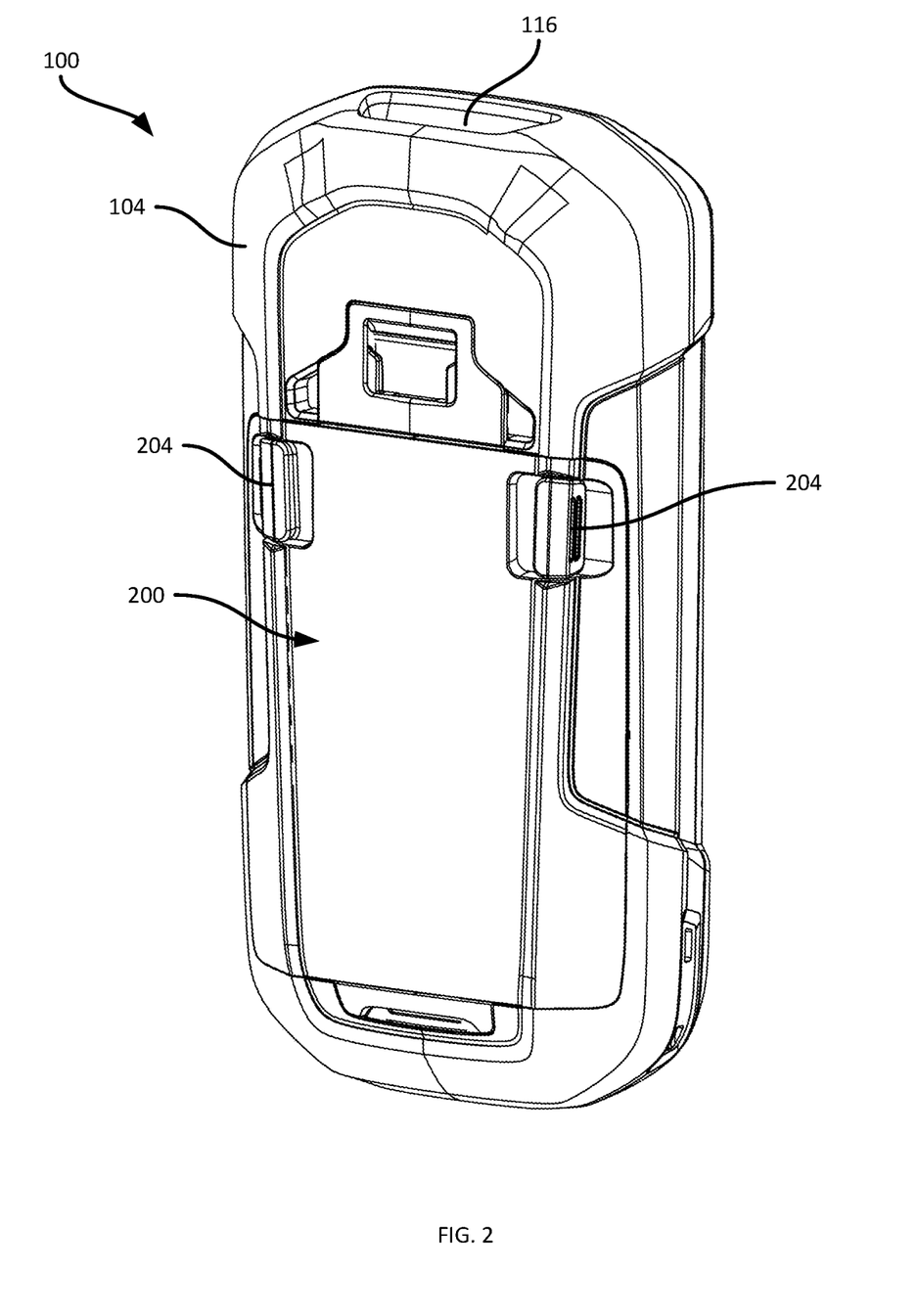
FIG. 2 is a rear isometric view of the mobile computing device of FIG. 1.
Figure 3:
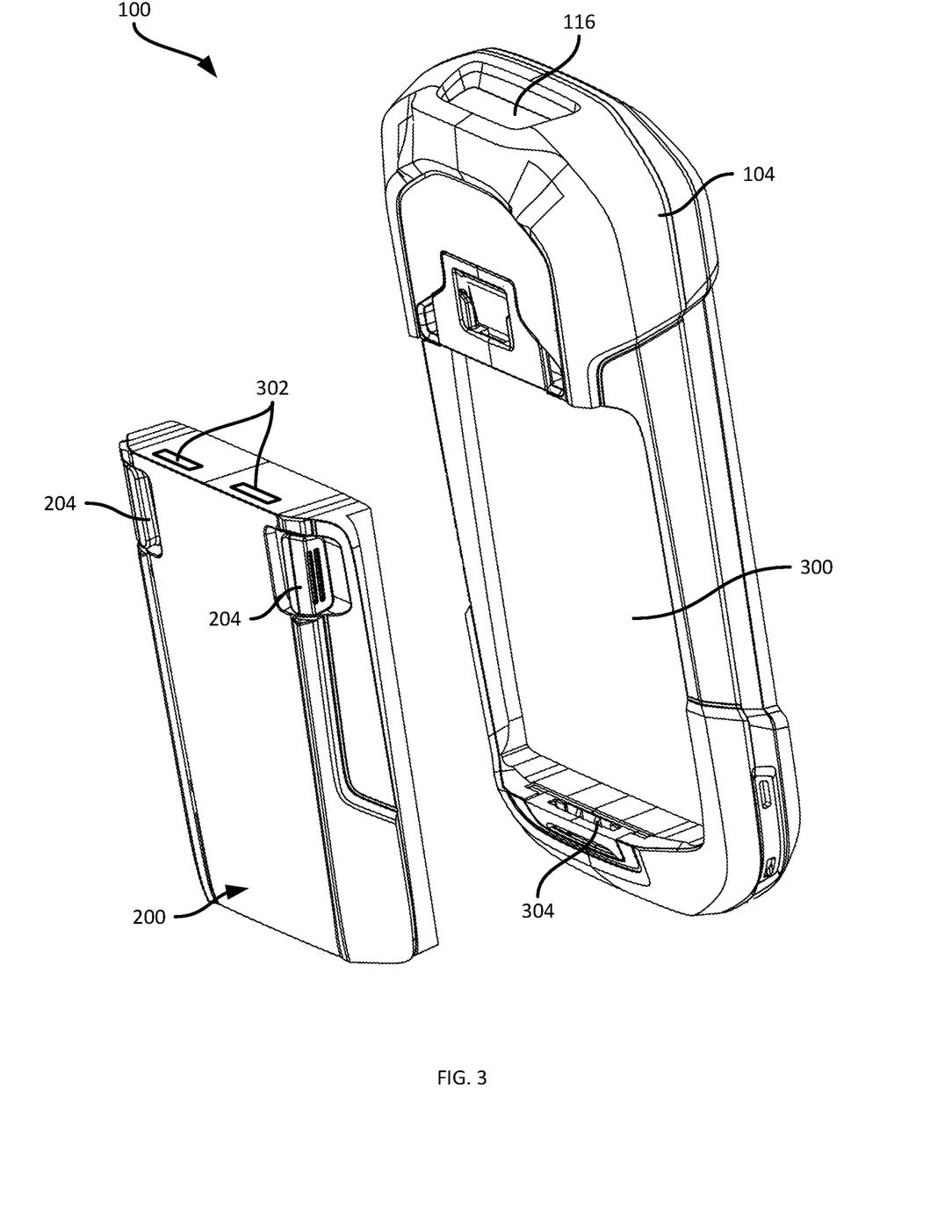
FIG. 3 is a diagram illustrating the mobile computing device of FIGS. 1 and 2 with a battery pack thereof removed.

Turning to FIG. 2, the device 100 can be powered by a battery pack 200 releasably secured to the housing 104. For example, the battery pack 200 can include movable buttons 204 to activate latches on the battery pack 200 to engage complementary features of the housing 104 to engage and release the battery pack 200 from the housing 104. While FIG. 2 illustrates the battery pack 200 in an engaged position, FIG. 3 illustrates the battery pack 200 following removal from the housing 104. In particular, FIG. 3 shows that the device 100 includes a battery compartment 300 defined by the housing 104. The battery compartment 300 receives the battery pack 200, and the buttons 204 can retract or extend latches 302 that engage the above-mentioned complementary structures within the battery compartment 300.

The battery compartment 300 also includes electrical contacts 304 to electrically connect power cells within the battery pack 200 to supply power from the battery pack 200 to various powered components of the device 100.

As will be apparent to those skilled in the art, the battery pack 200 may become discharged during use and may then be removed from the battery compartment 300 and replaced with another battery pack 200. However, removing the battery pack 200 from the device 100 interrupts the supply of electrical power to the device 100. The device 100 therefore implements functionality to prepare for such an interruption and enable the return to regular operation when a new battery pack 200 is inserted. Further, the device 100 implements functionality to automatically initiate the above-mentioned preparation under certain conditions.

Before discussing the functionality of the device 100 relating to preparing for a power supply interruption, certain internal components of the device 100 and the battery pack 200 will be discussed with reference to FIG. 4.

Figure 4:
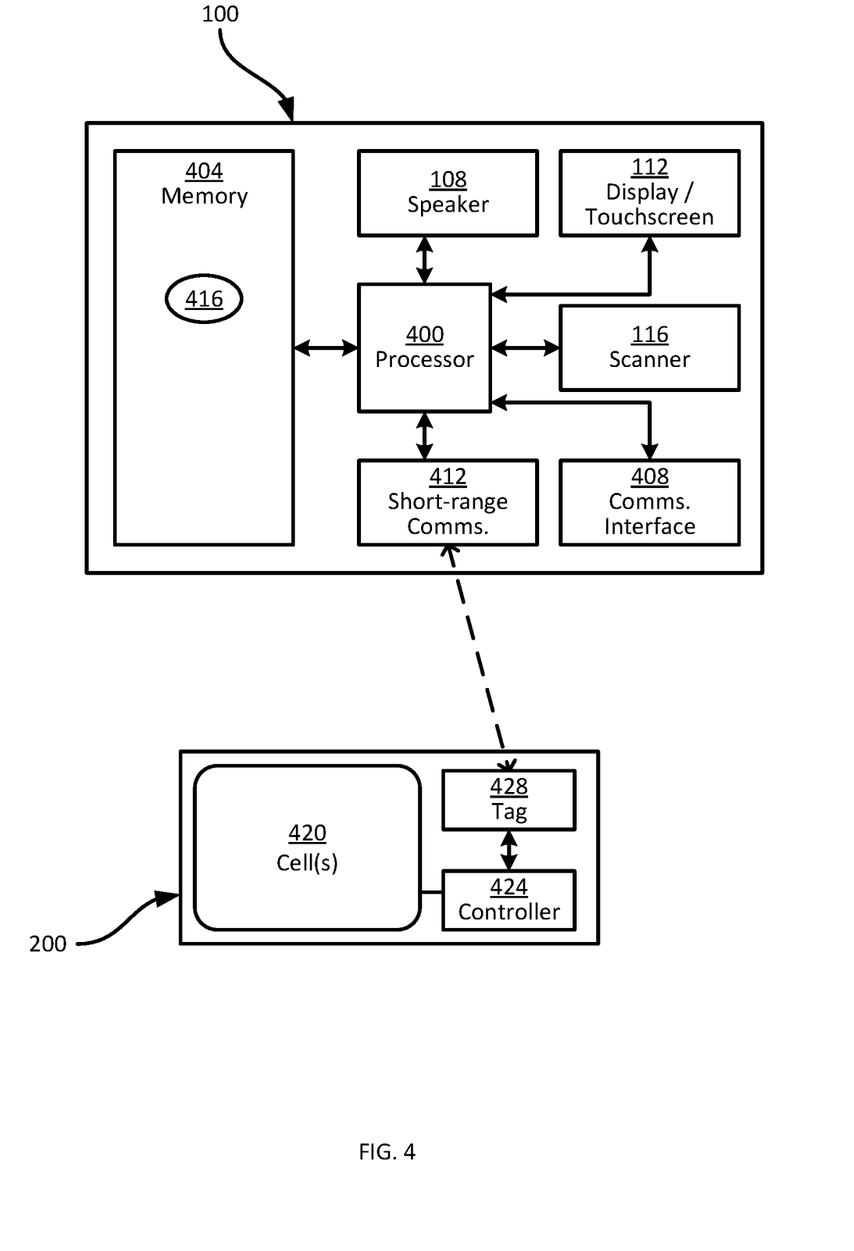
FIG. 4 is a block diagram of certain internal hardware components of the mobile computing device and battery pack of FIGS. 1 and 2.

Turning to FIG. 4, a block diagram of certain components of the device 100 is illustrated. The device 100 includes a special-purpose controller, such as a processor 400, interconnected with a non-transitory computer readable storage medium, such as a memory 404. The memory 404 includes a combination of volatile memory (e.g. Random Access Memory or RAM) and non-volatile memory (e.g. read only memory or ROM, Electrically Erasable Programmable Read Only Memory or EEPROM, flash memory). The processor 400 and the memory 404 each comprise at least one integrated circuit. In some examples, the processor 400 and the memory 404 can be implemented on a single integrated circuit, e.g. as a system on a chip (SoC).

Also shown in FIG. 4, and connected with the processor 400, are the input and output devices mentioned in connection with FIG. 1, namely the speaker 108, the display and touchscreen 112, and the scanner 116. As noted earlier, the device 100 can also include other input and/or output devices. Such other input and/or output devices, when present, are also connected with the processor 400.

The device 100 also includes a communications interface 408, such as at least one wireless transceiver and associated hardware and software components to enable the device 100 to communicate with other computing devices over a network. In addition, the device 100 includes a short-range communications interface 412. The short-range interface 412 also includes at least one transceiver and related hardware and software, and is distinguished from the interface 408 by the types of communications enabled thereby. In particular, while the interface 408 may enable communications over distances extending beyond about 50 meters (about 165 feet), e.g. via communication standards such as Wi-Fi and various cellular standards, the short-range interface 412 enables communications over distances that do not extend beyond about 50 meters. For example, the short-range interface 412 can implement any one or more of near-field communication (NFC), Bluetooth low energy (BLE) or radio frequency identification (RFID) standards. In the present example, the short-range interface 412 enables communication over distances below about 30 cm (about 12 inches), for example according to the NFC standard.

The short-range interface 412 as implemented at the device 100 can include all associated hardware and software for performing short-range communications. In other examples, the short-range interface 412 includes a portion of the associated hardware and software, while other components to enable short-range communication are implemented on the battery pack 200. For example, the battery pack 200 can carry an NFC antenna, while the short-range interface 412 can include processing circuitry and electrical contacts for connecting to the antenna when the battery pack 200 is engaged with the housing 104.

The memory 404 stores computer readable instructions for execution by the processor 400. In particular, the memory 404 stores a battery management application 416 (also referred to simply as the application 416) which, when executed by the processor 400, configures the processor 400 to perform various functions discussed below in greater detail and related to detecting battery packs and preparing the device 100 for swapping of battery packs. The application 416 may also be implemented as a suite of distinct applications in other examples. Those skilled in the art will appreciate that the functionality implemented by the processor 400 via the execution of the application 416 may also be implemented by one or more specially designed hardware and firmware components, such as FPGAs, ASICs and the like in other embodiments.

As also shown in FIG. 4, the battery pack 200 includes one or more energy storage cells 420, as well as a controller 424. The controller 424 can monitor various attributes of the cells 420, and based on those attributes can generate a continuously updated charge state indicator. The charge state indicator indicates a fraction of the maximum charge capacity of the cells 420 that is currently available from the cells 420. The charge state indicator may, for example, be expressed as a percentage, although various other forms of charge state indicator are also contemplated. The controller 424 can also maintain various other battery status information, including the charge state indicator. Other examples of battery status information include authentication data indicating a manufacturer of the battery pack 200, a maximum capacity indicator, a current battery temperature, a current battery voltage, an active error code, or the like.

The battery pack 200 also includes a wireless tag 428, such as an NFC tag. The tag 428 can be an active tag that is connected with the controller 424, enabling the tag 428 to receive data from the controller 424 and transmit such data (e.g. any or all of the battery status information mentioned above, including the charge state indicator). In other examples, the tag 428 is a passive tag, and the connection between the tag 428 and the controller 424 can be omitted. The tag 428 can store an identifier of the battery pack (e.g. a serial number or the like). The tag 428 can also store, in addition to or instead of the identifier, an indicator of device type (e.g. indicating that the tag 428 is associated with a battery). When the tag 428 is an active tag, the tag 428 can also store a current charge state indicator for the battery pack 200, obtained from the controller 424. As will now be apparent, the tag 428 and the short-range interface 412 enable the device 100 and the battery pack 200 to exchange data.

Figure 5:
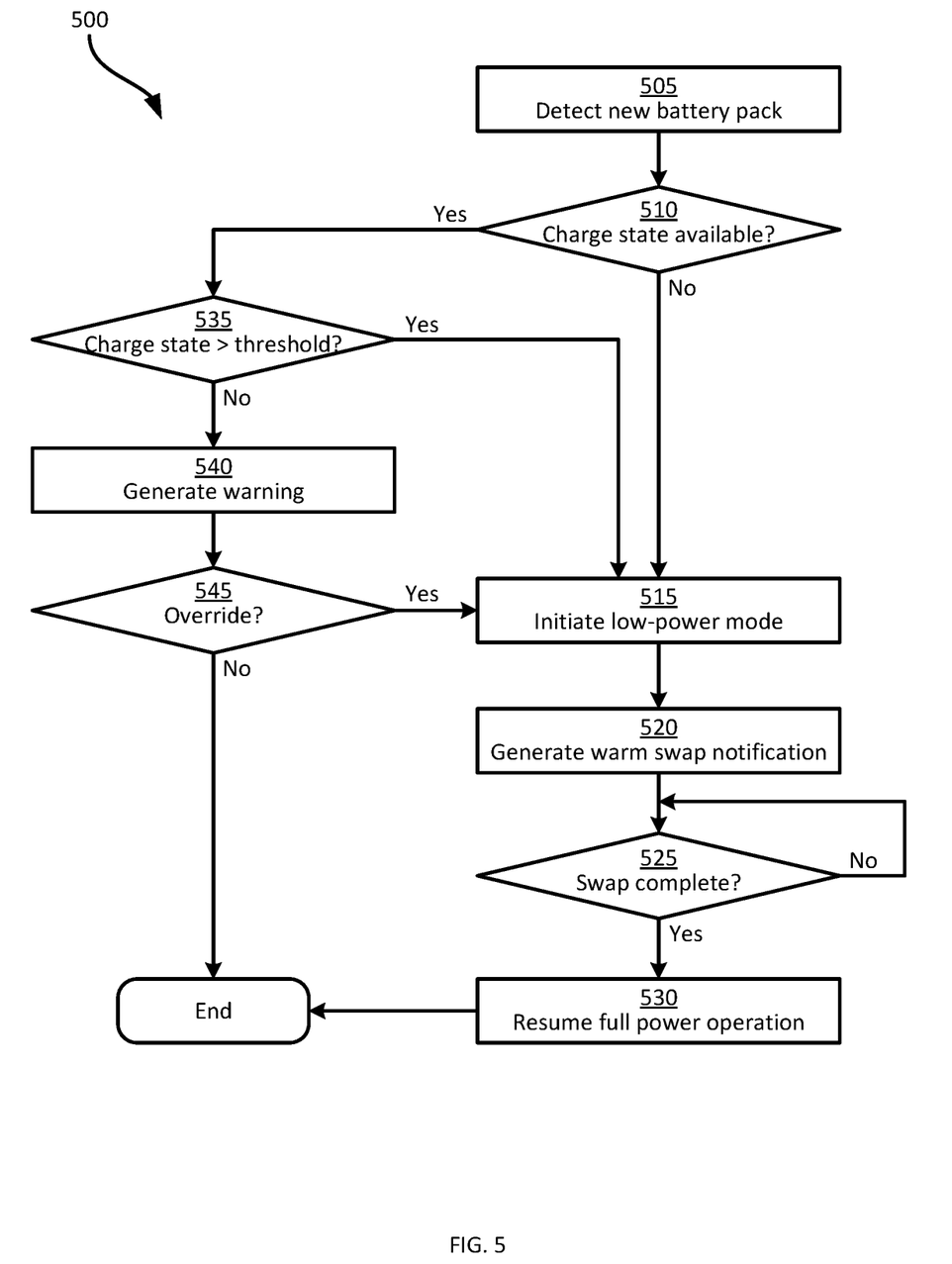
FIG. 5 is a flowchart of a method of warm battery swapping in the mobile computing device of FIGS. 1-4.

Turning now to FIG. 5, a method 500 for battery swapping is illustrated. The method 500 will be discussed below in conjunction with its performance by the device 100. In particular, the blocks of the method 500 are performed by the processor 400 in the examples below, as configured via execution of the application 416.

It is assumed that the device 100, prior to beginning the performance of the method 500, is equipped with a battery pack 200 and is powered on. At block 505, the device 100 detects a new battery pack 200, distinct from the battery pack 200 that is coupled to the device 100 and supplying power thereto. Specifically, the detection of the new battery pack 200 includes detection of physical proximity of the new battery pack 200 to the device 100.

Detection of the new battery pack 200 at block 505 includes detecting a tag 148 associated with the new battery pack 200 via the short-range communications interface 412. Detection of the tag 148 can include receiving the identifier, device type indicator or the like from the tag 148 as mentioned above. Detection of the tag 148 can also include receiving a charge state indicator at the interface 412, when the tag 148 is active.

At block 510, the device 100 can determine whether a charge state indicator for the new battery pack detected at 505 is available. In other words, at block 510 the device 100 can determine whether the charge state indicator was received at block 505. As noted above, some tags 148 may be active tags, capable of obtaining charge state information from the corresponding controller 424 for transmission to the device 100. Other tags, meanwhile, may be passive tags without the ability to obtain and transmit charge state information. In other examples, the determination at block 510 need not be limited to determining whether a charge state indicator is available. In such examples, at block 510 the device 100 can determine whether any of the above-mentioned battery status information is available.

When the determination at block 510 is affirmative, the device 100 can perform additional functionality to assess the current charge level of the new battery pack 200 before initiating a swapping procedure. That functionality will be described in greater detail further below. In the present example performance of the method 500, it is assumed that the determination at block 510 is negative, indicating that the tag 148 of the new battery pack 200 detected at block 505 is a passive tag lacking the ability to transmit charge state information. The device 100 therefore proceeds to block 515.

At block 515, the device 100 is configured, responsive to detecting the new battery pack 200, to automatically initiate placement of the device 100 into a low-power mode. The low-power mode may also be referred to as a standby, sleep or hibernate mode, in which some or all device functions are disabled to reduce power consumption. The low-power mode is generally, but not necessarily, distinguished from a full shut-down of the device 100 in that it enables more rapid return to regular operations.

Various implementations of low-power modes will occur to those skilled in the art. The device 100 can initiate the transition to the low-power mode, for example, by storing application state information (e.g. indications of currently running applications, and any application-specific information stored in volatile memory) in non-volatile memory. In other examples, power may continue to be supplied to volatile memory (e.g. from an auxiliary battery distinct from the battery pack 200), while power delivery to other components of the device 100 is disabled.

Figure 6:
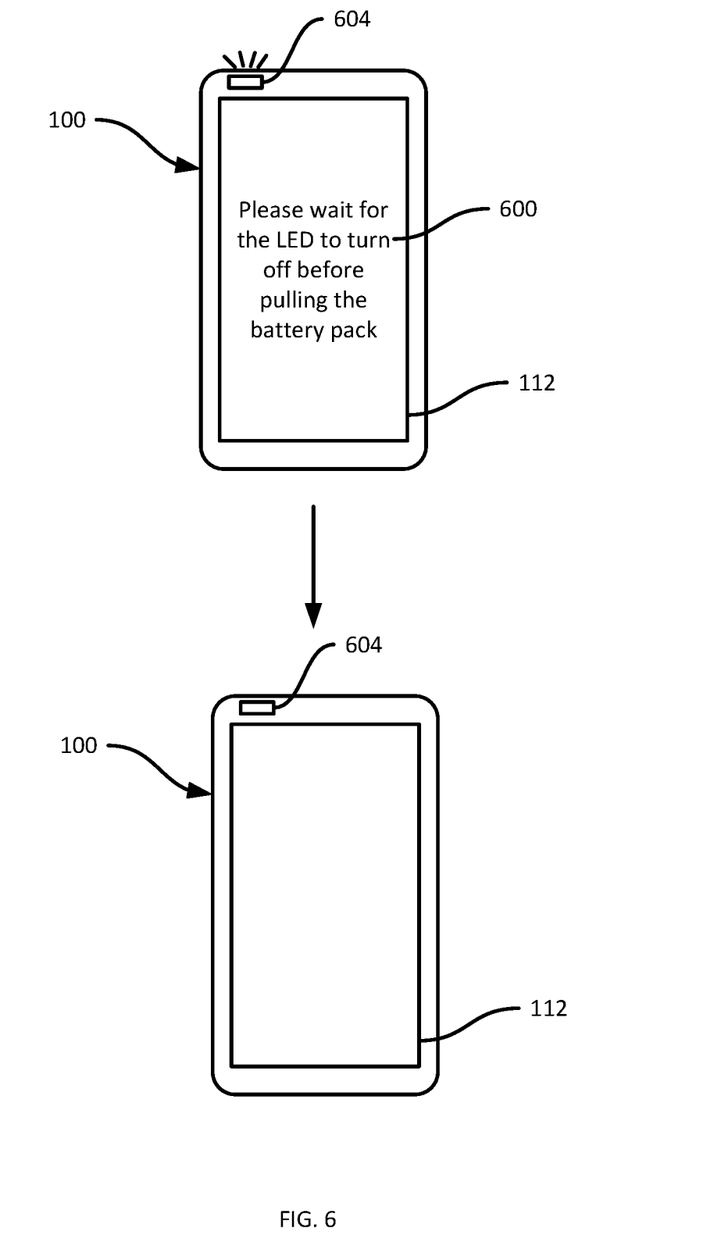
FIG. 6 is a diagram illustrating an example performance of blocks 515 and 520 of the method of FIG. 5.

At block 520, the device generates a warm swap notification, indicating readiness of the device 100 for swapping battery packs 200. The performance of block 520 can be with the performance of block 515. Various examples of warm swap notifications are simultaneously contemplated. For example, referring briefly to FIG. 6, the device 100 can render a message 600 on the display 112 indicating to an operator of the device 100 that the transition to the low-power mode will be complete when an LED 604 turns off. Simultaneously with rendering of the message 600, the processor 400 can also enable the LED 604. Once the transition to the low-power mode is complete, power delivery to both the display 112 and the LED 604 ceases (not necessarily simultaneously), and the LED therefore ceases to generate light.

Other forms of warm swap notifications are also contemplated. For example, the device 100 can generate an audible tone, recorded message or the like, indicating to the operator that upon cessation of the audible output the device 100 will be in the low-power mode. In another example, the device 100 includes a haptic output device such as a motor to vibrate the housing 104. In such examples, the notification at block 520 can be a vibration of the housing 104 upon completion of the transition to the low-power mode (following which the motor itself may be disabled).

When the notification has been generated at block 520 and the transition to the low-power mode is complete, the battery pack 200 can be removed from the battery compartment 300 and replaced with the new battery pack 200.

Returning to FIG. 5, at block 525 the device 100 determines whether the new battery pack 200 has been placed into the battery compartment 300 (that is, whether the battery swap is complete). The determination at block 525 can be automatic, or can include receiving an input via a button or other input device. For example, the processor 400 can be configured to detect, via the contacts 304, that power supply is once again available, indicating that the new battery pack 200 has been inserted. In other examples, the determination at block 525 can include detecting an activation of a power button on the housing 104 of the device 100.

Following an affirmative determination at block 525, the device resumes full power operation at block 530. Resuming full-power operation can include returning from the low-power mode to any of a variety of other modes of operation. As will be apparent, computing devices may be capable of reducing power consumption of, or disabling, certain components under some conditions. For example, wireless transceivers can be placed in a sleep state while other activities continue, when no wireless data transmissions are scheduled. In other examples, the processor 400 itself may be capable of operating in various different modes, with different levels of power consumption. These states are all referred to as "full-power" herein and are distinguished from the low-power mode in that they permit operation of the device 100 for at least some activities beyond awaiting a signal to awaken at block 525.

Returning to block 510, another example performance of the method 500 will be discussed, in the event that a charge state indicator is available for the new battery pack 200 detected at block 505.

When the determination at block 510 is affirmative, the processor 400 proceeds to block 535 rather than to block 515. At block 535, the processor 400 determines whether the charge state indicator received at block 505 exceeds a threshold. The threshold can be a predetermined threshold stored in the memory 404 (e.g. 50%, although thresholds above and below 50% may also be employed). The threshold may also be configurable, e.g. via execution of the application 416. For example, a prompt or other interface element may be presented on the display 112 for receipt of input data selecting the threshold.

In other examples, the threshold employed at block 535 can be determined dynamically, based on a charge state indicator of the current battery pack 200. For example, the threshold may be determined as a multiple of the charge state indicator of the current battery pack 200 (e.g. three times, up to a maximum of 100%).

As noted earlier, the device 100 can receive other battery status information in addition to, or instead of, the charge state indicator. At block 535, therefore, the device 100 can be configured to determine whether the battery status information satisfies at least one criterion. The charge state threshold is an example of such a criterion. Other examples of criteria applied at block 535 include whether a battery manufacturer matches an expected battery manufacturer identifier stored at the device 100. Other examples of criteria applied at block 535 include a minimum voltage threshold, such that the determination at block 535 is affirmative only when a current voltage reported by the new battery pack 200 is above the threshold voltage.

When the determination at block 535 is affirmative, performance of the method 500 proceeds to block 515, as discussed above. In some examples, following an affirmative determination at block 535 the device 100 can present a prompt on the display 112 and await an instruction from the operator of the device 100 to proceed with a transition to the low-power mode, or to abort the process and continue with full-power operation.

When the determination at block 535 is negative (i.e. when the new battery pack 200 has a charge state indicator that does not exceed the threshold) the device 100 proceeds to block 540. At block 540 the device 100 generates a warning notification, such as an audible alert, a displayed message, or the like, indicating that the new battery pack 200 is not suitable for swapping to replace the current battery pack 200. Following the performance of block 540, the performance of the method 500 can terminate. That is, when the charge state indicator of the new battery pack 200 fails to meet the threshold, the swap process can be aborted automatically.

Figure 7:
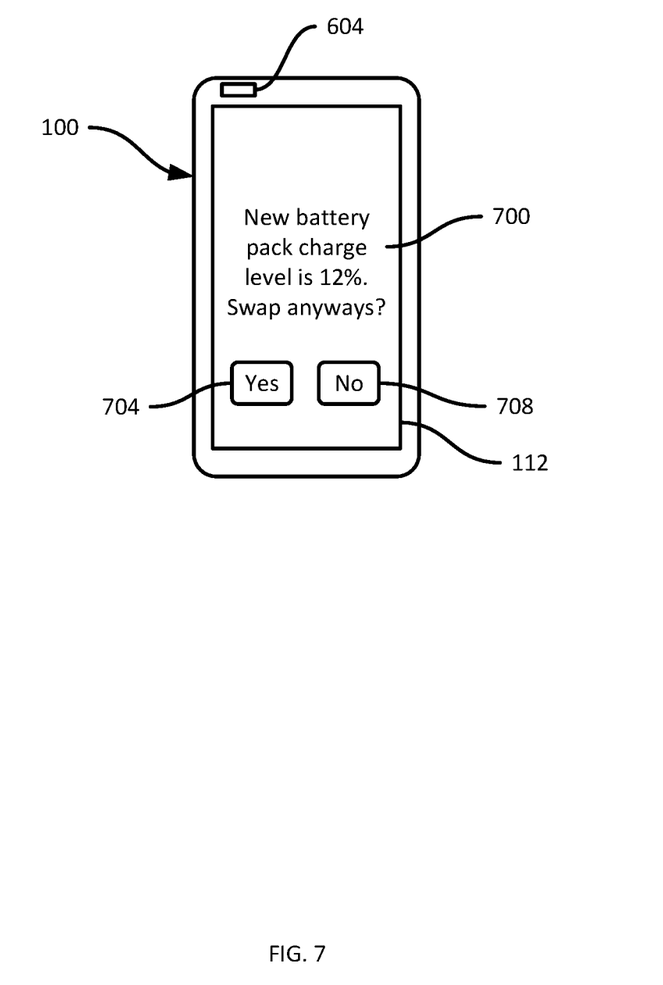
FIG. 7 is a diagram illustrating an example performance of block 545 of the method of FIG. 5.

In other examples, as shown in FIG. 5, the device 100 can instead proceed to block 545 and determine whether an override instruction has been received. For example, following a negative determination at block 535, at block 540 the device can generate both the above-mentioned warning and selectable options for proceeding with a battery swap or aborting the battery swap. Referring briefly to FIG. 7, the device 100 is shown with a warning message 700 shown on the display 112, as well as selectable elements 704 and 708. Selection of the element 704 instructs the device 100 to proceed with the battery swap (i.e. to proceed from block 545 to block 515) despite the low charge state indicator of the new battery pack 200. Selection of the element 708 aborts the battery swap process and ends performance of the method 500.

Variations to the above functionality are contemplated. For example, when a charge state indicator is available from the new battery pack, the notification generated at block 520 can include rendering or other output of the charge state indicator, e.g. via the display 112, the speaker 108, or the like.

In further examples, the short-range communications interface 412 of the device 100 can be disabled until a charge state indicator of the currently-inserted battery pack 200 falls below a threshold (e.g. 20%, although thresholds greater and lower than 20% are also contemplated). When the current charge state indicator falls below the threshold, the short-range communications interface 412 can be enabled to allow the performance of block 505 of the method 500. In other words, prior to block 505 being performed, the device 100 can determine whether a current charge state indicator is below the above-mentioned threshold.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile computing device, comprising:
    a battery compartment configured to removably secure a first battery pack;
    an output device; and
    a processor configured to:
        detect a second battery pack in proximity to the mobile computing device;
        determine whether the second battery pack satisfies a minimum charge threshold;
        responsive to detecting the second battery pack and determining that the second battery pack satisfies the minimum charge threshold, (a) automatically place the mobile computing device in a low-power operational mode, and (b) when the mobile computing device is in the low-power operational mode, control the output device to generate a battery swap readiness notification; and
        responsive to securing of the second battery pack in the battery compartment in place of the first battery pack, return the mobile computing device to a full-power operational mode.

2. The mobile computing device of claim 1, further comprising:
    a short-range communications interface;
    wherein the processor is further configured, in order to detect physical proximity of the second battery pack, to detect a wireless tag associated with the second battery pack, via the short-range communications interface.

3. The mobile computing device of claim 2, wherein the processor is further configured to:
    receive, from the wireless tag, battery status information corresponding to the second battery pack; and
    determine, prior to placement of the mobile computing device in the low-power mode, whether the battery status information satisfies the minimum charge threshold.

4. The mobile computing device of claim 1, wherein the processor is further configured to detect placement of the second battery pack in the battery compartment prior to return of the mobile computing device to the full-power operational mode.

5. The mobile computing device of claim 1, further comprising:
    an input device;
    wherein the processor is further configured to detect activation of the input device prior to return of the mobile computing device to the full-power operational mode.

6. A method, comprising:
    detecting a second battery pack in proximity to a mobile computing device having a battery compartment configured to removably secure a first battery pack;
    determining whether the second battery pack satisfies a minimum charge threshold;
    responsive to detecting the second battery pack and determining that the second battery pack satisfies the minimum charge threshold, (a) automatically placing the mobile computing device in a low-power operational mode, and (b) when the mobile computing device is in the low-power operational mode, controlling an output of the mobile computing device to generate a battery swap readiness notification; and
    responsive to securing of the second battery pack in the battery compartment in place of the first battery pack, returning the mobile computing device to a full-power operational mode.

7. The method of claim 6, wherein detecting physical proximity of the second battery pack includes detecting a wireless tag associated with the second battery pack, via a short-range communications interface of the mobile computing device.

8. The method of claim 7, further comprising:
    receiving, from the wireless tag, battery status information corresponding to the second battery pack; and
    determining, prior to placement of the mobile computing device in the low-power mode, whether the battery status information satisfies the minimum charge threshold.

9. The method of claim 6, further comprising detecting placement of the second battery pack in the battery compartment prior to returning the mobile computing device to the full-power operational mode.

10. The method of claim 6, further comprising detecting activation of an input device of the mobile computing device prior to returning the mobile computing device to the full-power operational mode.

11. A mobile computing device, comprising:
    a battery compartment configured to removably secure a first battery pack;
    an output device;

an input device; and
a processor configured to:
> detect a second battery pack in proximity to the mobile computing device;
> receive battery status information from the second battery pack;
> determine whether the battery status information meets a criterion;
> when the battery status information does not meet the criterion, control the output device to generate a warning notification; and
> when the battery status information meets the criterion, automatically place the mobile computing device in a low-power operational mode,
> wherein the processor is further configured to detect activation of the input device to override the warning notification prior to placing the mobile computing device in the low-power operational mode.

12. The mobile computing device of claim 11, further comprising:
> a memory;
> wherein the battery status information includes a charge state indicator, and the criterion is a threshold; and
> wherein the processor is further configured to retrieve the threshold from the memory.

13. The mobile computing device of claim 11, wherein the battery status information includes a charge state indicator, and the criterion is a threshold; and
> wherein the processor is further configured to obtain a first charge state indicator from the first battery pack, and dynamically generate the threshold based on the first charge state indicator.

14. The mobile computing device of claim 11, wherein the processor is further configured to, when the mobile computing device is in the low-power operational mode, control the output device to generate a battery swap readiness notification.

15. A method, comprising:
detecting a second battery pack in proximity to a mobile computing device having a battery compartment configured to removably secure a first battery pack;
receiving battery status information from the second battery pack;
determining whether the battery status information satisfies a minimum charge threshold; and
when the battery status information does not satisfy the minimum charge threshold, controlling an output device of the mobile computing device to generate a warning notification; and
when the battery status information satisfies the minimum charge threshold, automatically placing the mobile computing device in a low-power operational mode.

16. The method of claim 15, further comprising:
detecting activation of an input device of the mobile computing device to override the warning notification prior to placing the mobile computing device in the low-power operational mode.

17. The method of claim 15,
wherein the method further comprises: retrieving the minimum charge threshold from a memory of the mobile computing device.

18. The method of claim 15,
wherein the method further comprises:
> obtaining a first charge state indicator from the first battery pack; and
> dynamically generating the minimum charge threshold based on the first charge state indicator.

19. The method of claim 15, further comprising, when the mobile computing device is in the low-power operational mode, controlling the output device to generate a battery swap readiness notification.

* * * * *